US012786536B2

(12) United States Patent
Katsumata

(10) Patent No.: US 12,786,536 B2
(45) Date of Patent: Nov. 3, 2026

(54) IMAGE CAPTURING APPARATUS INCLUDING SHAKE CORRECTION MECHANISM

(71) Applicant: CANON KABUSHIKI KAISHA, Tokyo (JP)

(72) Inventor: Momoe Katsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/207,813

(22) Filed: May 14, 2025

(65) Prior Publication Data

US 2025/0365490 A1 Nov. 27, 2025

(30) Foreign Application Priority Data

May 22, 2024 (JP) ................................ 2024-083400

(51) Int. Cl.
*H04N 23/52* (2023.01)
*H04N 23/68* (2023.01)

(52) U.S. Cl.
CPC ............ *H04N 23/52* (2023.01); *H04N 23/68* (2023.01)

(58) Field of Classification Search
CPC ........ H04N 23/52; H04N 23/68; H04N 23/54; H04N 23/687
See application file for complete search history.

(56) References Cited

U.S. PATENT DOCUMENTS

2022/0329713 A1* 10/2022 Sugaya .................. G03B 17/55
2023/0164945 A1* 5/2023 Watanabe ............. H04N 23/54 361/695
2023/0232088 A1* 7/2023 Katsumata ............ H04N 23/52 348/208.7
2024/0340509 A1* 10/2024 Park ....................... H04N 23/52
2025/0056119 A1* 2/2025 Kim ....................... H04N 23/51

FOREIGN PATENT DOCUMENTS

JP 2022162695 A 10/2022
WO 2020202811 A1 10/2020

* cited by examiner

*Primary Examiner* — Nhan T Tran
(74) *Attorney, Agent, or Firm* — Cowan, Liebowitz & Latman, P.C.

(57) ABSTRACT

An image capturing apparatus includes an image shake correction mechanism including a movable part for holding an image sensor and a support part that supports the movable part such that the movable part is movable in a direction perpendicular to an optical axis direction. The image sensor is mounted on an image capturing board. The heat dissipation member is formed by a board affixing area affixed to the image capturing board, a support part affixing area affixed to the support part, and a connection portion that connects between the board affixing area and the support part affixing area. The board affixing area is located closer to an image capturing optical axis than the support part affixing area, and does not overlap the support part affixing area.

11 Claims, 11 Drawing Sheets

IMAGE CAPTURING APPARATUS INCLUDING SHAKE CORRECTION MECHANISM

BACKGROUND

Field of the Technology

The present disclosure relates to an image capturing apparatus, and more particularly to an image capturing apparatus including a shake correction mechanism capable of efficiently dissipating heat.

Description of the Related Art

An image capturing apparatus, such as a digital still camera or a video camera, includes mounted therein, an image sensor, such as a CMOS sensor, for capturing an object, and electronic devices such as a central processing unit (CPU) and an integrated circuit (IC), which are mounted on a circuit board. The image sensor and the electronic devices usually generate heat. When the temperature of the image sensor and the electronic devices rises to an excessive degree, there is a possibility that it is impossible to properly capture an image due to lowered performance or occurrence of malfunction of these devices.

Further, in recent years, an image capturing apparatus has come to be widely used which is equipped with a so-called “image shake correction mechanism” that corrects image shake by moving an image sensor in a direction perpendicular to an optical axis so as to improve image quality. Such an image capturing apparatus including the image shake correction mechanism is demanded to have a sufficient heat dissipation property since heat generated by an image sensor during driving of the shake correction mechanism, continuous shooting, moving image capturing, and the like, affects image quality.

For example, PCT International Patent Publication No. WO2020/202811 discloses a structure in which load on the image shake correction mechanism is reduced by setting the direction of thickness of a flexible heat transfer member connecting between a movable part and a support part of the image shake correction mechanism to a direction perpendicular to an optical axis direction. Further, Japanese Laid-Open Patent Publication (Kokai) No. 2022-162695 discloses an image capturing apparatus which reduces load on the image shake correction mechanism by setting the direction of extension of a heat transfer member connecting between a movable part and a support part of an image shake correction mechanism and the direction of extension of a flexible board connecting between an image capturing board and a control board to the same direction.

However, in related art disclosed by PCT International Patent Publication No. WO2020/202811, described above, the direction of thickness of the heat transfer member is set to a direction perpendicular to the optical axis direction. Therefore, to improve the heat dissipation property, it is required to increase the number of heat transfer members or increase the width of heat transfer members. Further, in related art disclosed by Japanese Laid-Open Patent Publication (Kokai) No. 2022-162695, heat is transferred to the support part via a movable member holding an image sensor, and further, it is required to form the heat transfer member as a thin and long member to reduce the load on the image shake correction member. Therefore, there is a problem of degraded efficiency of heat transfer from the image sensor to the support part.

SUMMARY

The present disclosure provides an image capturing apparatus that includes an image shake correction mechanism capable of efficiently dissipating heat from an image sensor without impairing the controllability of driving a movable part. According to a first aspect of the present disclosure, there is provided an image capturing apparatus including an image shake correction mechanism including a movable part for holding an image sensor and a support part that supports the movable part such that the movable part is movable in a direction perpendicular to an optical axis direction, including an image capturing board on which the image sensor is mounted, and a heat dissipation member, wherein the heat dissipation member is formed by a board affixing area which is affixed to the image capturing board, a support part affixing area which is affixed to the support part, and a connection portion that connects between the board affixing area and the support part affixing area, wherein the board affixing area is located closer to an image capturing optical axis than the support part affixing area, and does not overlap the support part affixing area.

According to a second aspect of the present disclosure, there is provided an image capturing apparatus including an image shake correction mechanism including a movable part for holding an image sensor and a support part that supports the movable part such that the movable part is movable in a direction perpendicular to an optical axis direction, including an image capturing board on which the image sensor is mounted, a second board fixed to the image capturing board, and a heat dissipation member that connects between the second board and the support part, wherein the heat dissipation member is formed by a board affixing area which is affixed to the second board, a support part affixing area which is affixed to the support part, and a connection portion that connects between the board affixing area and the support part affixing area, and wherein the board affixing area is located closer to an image capturing optical axis than the support part affixing area, and does not overlap the support part affixing area.

According to the present disclosure, there is produced an effect of realizing an image capturing apparatus including an image shake correction mechanism capable of efficiently dissipating heat from an image sensor without impairing the controllability of driving a movable part.

Features of the present disclosure will become apparent from the following description of embodiments with reference to the attached drawings. The following description of embodiments are described by way of example.

DESCRIPTION OF THE EMBODIMENTS

The present disclosure will now be described in detail below with reference to the accompanying drawings showing embodiments thereof. Configurations described in the following embodiments are described by way of example, and the scope of the disclosure is not limited to the configurations described in the present embodiments. First, a first embodiment of the disclosure will be described. In the embodiments of the present disclosure described below, a digital camera 100 will be described as an example of the image capturing apparatus, but the digital camera 100 is only an example. Other cameras than the digital camera 100 can be described as the image capturing apparatus. For example, a camera mounted on a smartphone or the like can be described as an example of the image capturing apparatus. Further, an optical axis direction, mentioned hereinafter, is a direction of an image capturing optical axis.

Figure 1:
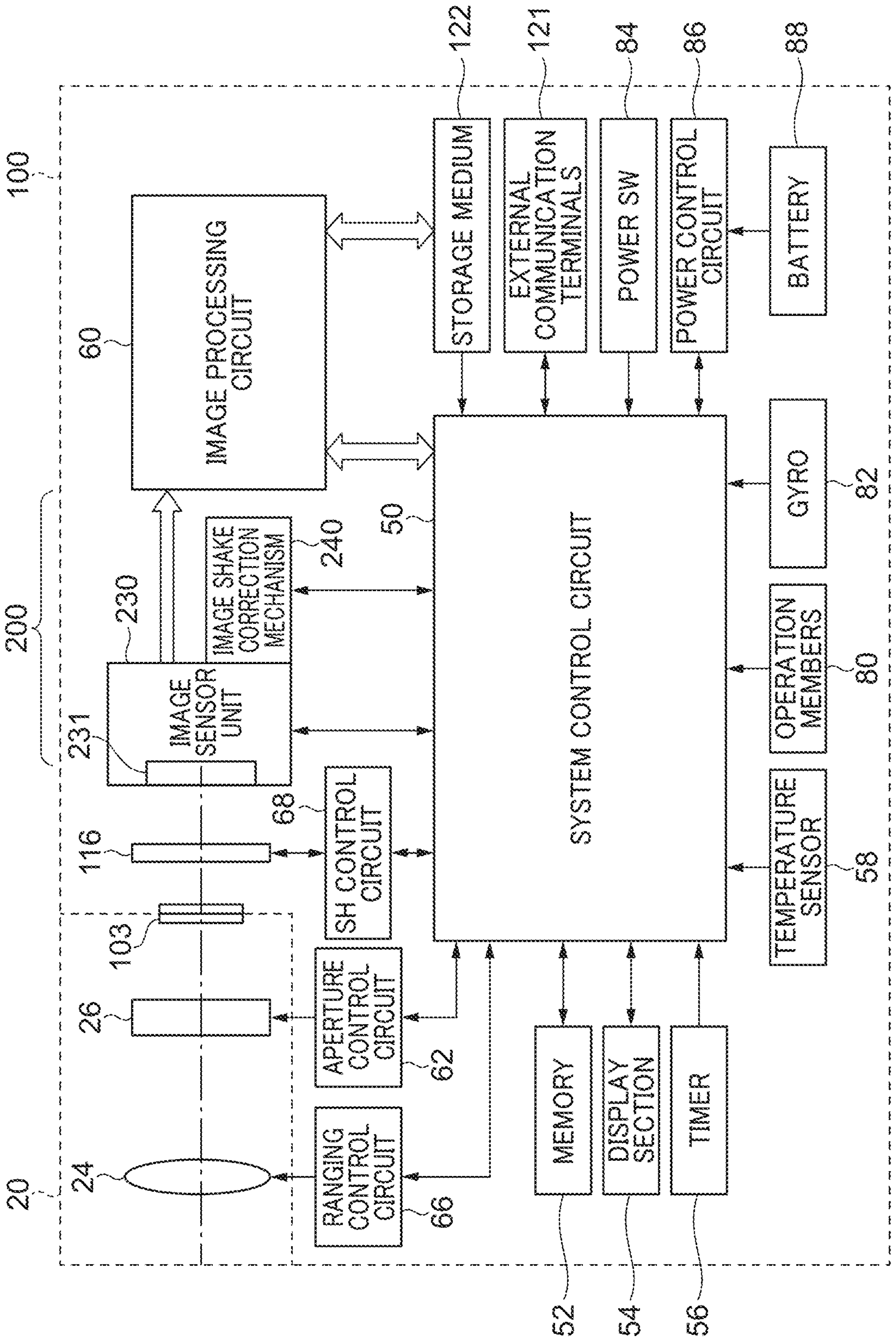
FIG. 1 is a block diagram of a digital camera as an image capturing apparatus according to a first embodiment of the present disclosure.

FIG. 1 is a block diagram of the digital camera 100. The digital camera 100 includes a lens unit 20 attached thereto via a mount 103. The lens unit 20 includes an image capturing lens 24 and a diaphragm 26, arranged sequentially from an object side. The mount 103 enables the lens unit 20 to be removably attached to the digital camera 100. A shutter 116 is disposed on a side of the lens unit 20 toward an image, and an image capturing unit 200 is disposed on a side of the shutter 116 toward the image. The image capturing unit 200 includes an image sensor unit 230 having an image sensor 231 fixed to an object side (front side) thereof, and an image shake correction mechanism 240 fixedly holding the image sensor unit 230. That is, the image capturing unit 200 includes the image sensor unit 230 having the image sensor 231, and the image shake correction mechanism 240.

The shutter 116 is a light shielding member which is opened and closed to thereby control the amount of light exposure to the image sensor 231 in the image capturing unit 200. Light flux entering the image capturing lens 24 is guided through the diaphragm 26 and the shutter 116 to an imaging surface of the image sensor 231 to form an optical image thereon. As described above, the image capturing unit 200 includes the image sensor unit 230 and the image shake correction mechanism 240, and the image sensor 231 fixed on a front side of the image sensor unit 230 converts the optical image to electrical signals. Further, the image shake correction mechanism 240 realizes “image sensor shift-type image shake correction” by driving the image sensor 231 on a plane perpendicular to an optical axis direction (image capturing direction) according to a shake amount detected by a gyro 82 to thereby correct an image shake.

Further, the digital camera 100 includes a system control circuit 50 that controls the entire digital camera. A variety of devices are connected to the system control circuit 50. As shown in FIG. 1, a memory 52, a display section 54, a timer 56, a temperature sensor 58, operation members 80, the gyro 82, a battery 88, a power control circuit 86, a power switch (SW) 84, external communication terminals 121, a storage medium 122, and an image processing circuit 60. Further, a ranging control circuit 66, an aperture control circuit 62, and an SH control circuit 68 are connected to the system control circuit 50.

As described above, the system control circuit 50 controls the entire digital camera 100, and the memory 52 stores operation constants, variables, programs, and so forth. The system control circuit 50 executes the programs stored in the memory 52 to thereby realize a variety of required functions of the present disclosure. For example, the system control circuit 50 functions as determination means and control means for a variety of operations of the digital camera 100. Further, the memory 52 stores a state of holding the image sensor unit 230 by the image shake correction mechanism 240.

Further, the system control circuit 50 controls the ranging control circuit 66, the aperture control circuit 62, and the SH control circuit 68, based on results of calculation performed by the image processing circuit 60 for processing image data formed by the image sensor 231. As a result, the shutter 116, the image capturing lens 24, the diaphragm 26 are controlled to execute autofocus (AF) processing and auto exposure (AE) processing.

The display section 54 is comprised of a rear display section 175 and an electronic view finder (EVF) display section 176, described hereinafter with reference to FIG. 2 and the like, for displaying information related to image capturing. The temperature sensor 58 measures the temperatures of the image sensor 231, other heat generating parts, and so forth. The operation members 80 are various buttons, switches, and the like, which are operated for selecting and setting various kinds of functions, and providing instructions for image capturing and image reproduction. Although in FIG. 1, a single operation member 80 is illustrated, in actuality, a plurality of operation members 80 are provided. The gyro 82 detects an amount of image shake of the digital camera 100. The power SW 84 is an operation device for switching the power-on and power-off of the digital camera 100.

The power control circuit 86 is comprised of a battery detection circuit, a DC/DC converter, and a switch circuit for switching between energized blocks, for supplying a required voltage to each device using the battery 88 as a power source. Specifically, the power control circuit 86 detects the remaining charge of the battery 88 as a power source of the digital camera 100, and supplies required voltages to units including the storage medium 122, over a required time period, based on a result of the detection and an instruction from the system control circuit 50. The gyro 82 is a sensor for detecting a shake amount of the digital camera 100.

Further, the storage medium 122 is a device implemented e.g. by a smart card for storing an image captured by the digital camera 100, and can be removably attached to the digital camera 100. The external communication terminals 121 enable wired or wireless communication of required information including a captured image, between the digital camera 100 and other information devices. For example, the external communication terminals 121 are implemented by Bluetooth (registered trademark) or the like. The timer 56 transmits a timeout signal to the system control circuit 50 when a time period has elapsed which is set by the system control circuit 50 for required control, processing, and the like.

Figure 2:
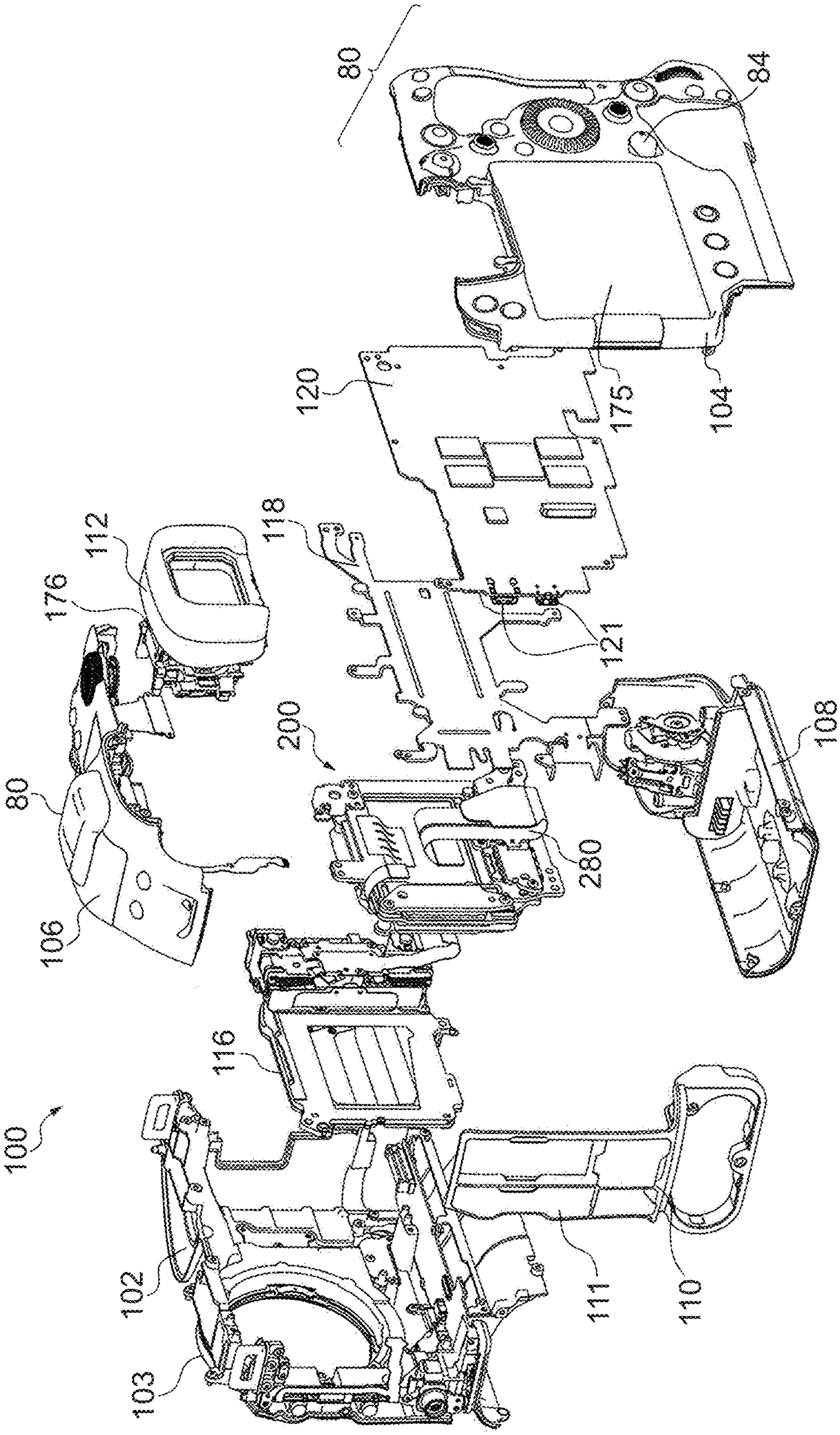
FIG. 2 is a rear exploded perspective view of the digital camera.

Referring to FIG. 2, the digital camera 100 includes, as exterior members, a front base 102, a rear cover 104, a top cover 106, a bottom cover 108, and a side cover 110. These exterior members form a surface of the appearance of the digital camera 100.

The front base 102 is formed of a magnesium diecast, a resin, or the like, and has the mount 103 fixed to a front portion thereof on which the lens unit 20 is mounted, and is provided with a grip portion (not shown) for grasping the digital camera 100. Attached to the rear cover 104 are the operation members 80 and the rear display section 175 which can be opened and closed. The rear display section 175 is attached to a rear central portion of the rear cover 104. Further attached to the rear cover 104 are the EVF display section 176 illustrated at a central upper location in FIG. 2 and a finder unit 112 for user's viewing. The rear display section 175 is implemented by a display device, such as a liquid crystal display or an electroluminescence (EL) display.

On the top cover 106, there are mounted the operation members 80. The bottom cover 108 has a battery chamber formed therein for receiving the battery 88 appearing in FIG. 1, and is capable of having a tripod mount attached thereto for fixing the digital camera 100. The side cover 110 is provided with a terminal cover 111 for protecting the external communication terminals 121 appearing in FIG. 1.

Inside the exterior members, the shutter 116, the image capturing unit 200, a chassis 118, a print circuit board 120, and so forth are sequentially arranged from an object side. On the print circuit board 120, there are mounted electronic devices including the system control circuit 50 and the image processing circuit 60, described above, and, a variety of electronic parts including a connector to which the storage medium 122 is attached. To the print circuit board 120, there are fixed the front base 102 and the chassis 118 made of a metal or the like, with screws or the like. Further, on the print circuit board 120, there are mounted the external communication terminals 121.

A flexible circuit board 280 is flexible and connects the image sensor unit 230 included in the image capturing unit 200, and the print circuit board 120. Further, image signals output from the image sensor 231 are sent to the electronic devices including the system control circuit 50 mounted on the print circuit board 120, via the flexible circuit board 280.

The image sensor 231 particularly consumes much power in the digital camera 100. Therefore, the temperature of the image sensor 231 readily rises and if it rises higher than a predetermined temperature, the high temperature has adverse effects on a captured image, and hence it is required to keep the temperature of the image sensor 231 lower than the predetermined temperature. To meet this requirement, the image capturing unit 200 including the image sensor 231 is fixed to the front base 102 with screws or the like. This makes it possible to dissipate heat generated by the image capturing unit 200 by transferring the heat to the front base 102.

Figure 3A:
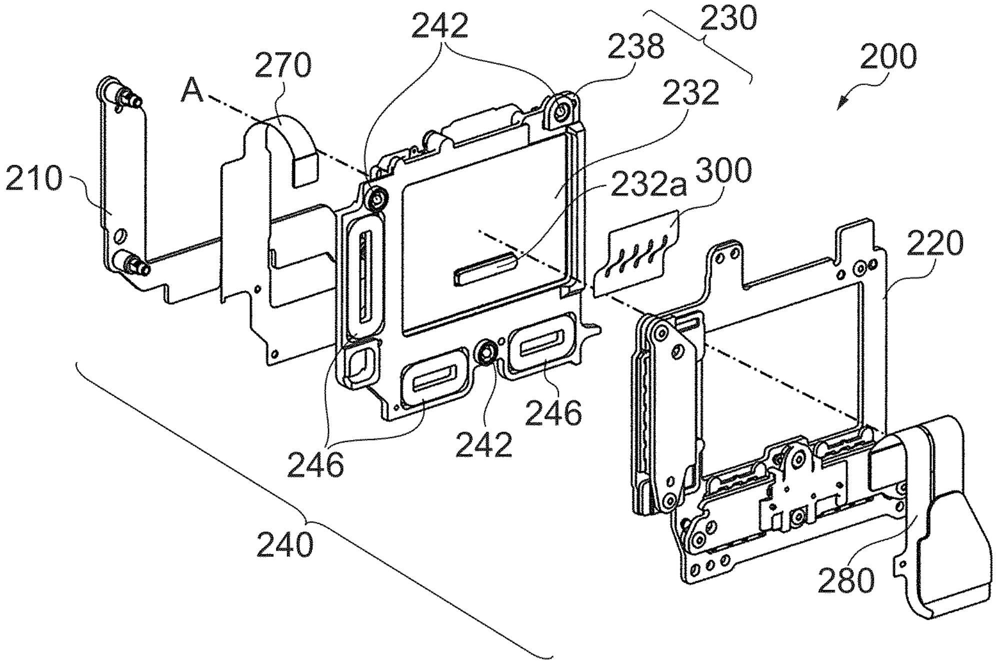
FIGS. 3A and 3B are exploded perspective views of an image capturing unit and an image shake correction mechanism inside the image capturing unit.
Figure 3B:
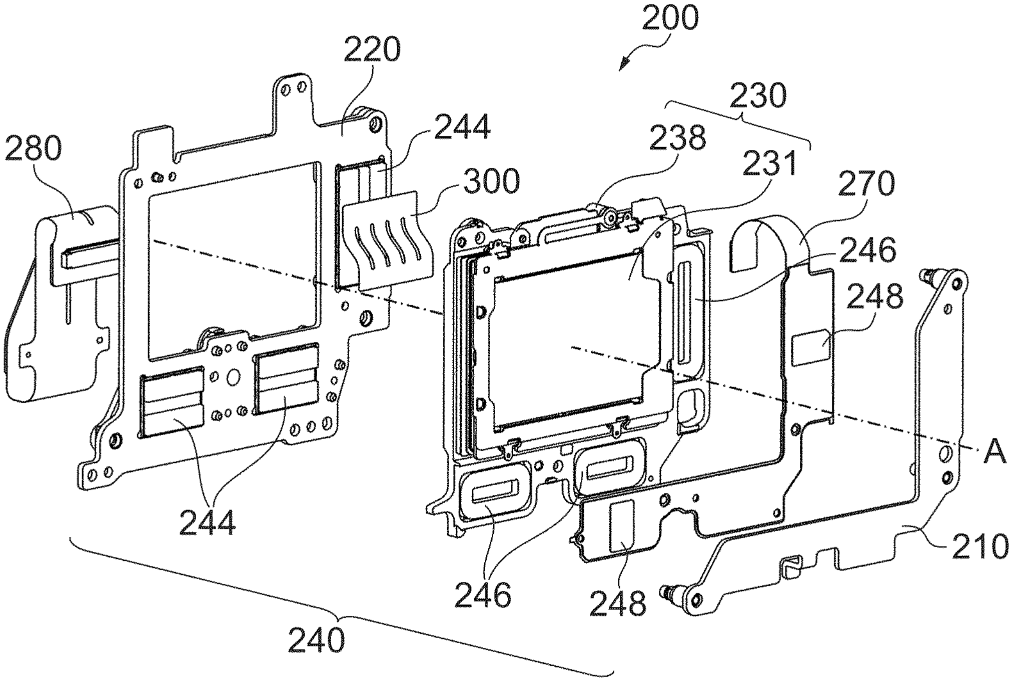

Next, by referring to FIGS. 3A and 3B, and FIGS. 4A and 4B, the image shake correction mechanism 240 in the image capturing unit 200 will be described. FIGS. 3A and 3B are exploded perspective views of the image capturing unit 200 and the image shake correction mechanism 240 inside the image capturing unit 200, and FIG. 3A is an exploded perspective view as viewed from the rear side, while FIG. 3B is an exploded perspective view as viewed from the front side. In FIG. 3A, as the location is more right, there are illustrated components toward the rear side of the digital camera 100, and in FIG. 3B, as the location is more right, there are illustrated components toward the front side of the digital camera 100.

The image sensor unit 230 included in the image capturing unit 200 is configured to be sandwiched between a front-side plate 210 and a rear-side plate 220, which are made of e.g. metal plate. The rear-side plate 220 is fixed to the front base 102 (see FIG. 2 and the like) e.g. with screws, and is fixed to the front-side plate 210 with the image sensor unit 230 sandwiched between the rear-side plate 220 and the front-side plate 210.

Arranged between an image sensor holder 238 as a component of the image sensor unit 230 and the rear-side plate 220 is an image capturing board 232 on which the image sensor 231 is mounted. Then, around the image capturing board 232, a total of three balls 242 are rollably supported, by way of example, and these are arranged such that they surround an image capturing optical axis A. The balls 242 freely roll, whereby the image sensor unit 230 is held such that it is swingable between the front-side plate 210 and the rear-side plate 220 in a direction perpendicular to the image capturing optical axis A.

That is, the image shake correction mechanism 240 is formed by the rear-side plate 220 (support) that supports the image sensor holder 238 such that the image sensor holder 238 is movable in a direction perpendicular to the image capturing optical axis A, and the balls 242. Further, the image shake correction mechanism 240 is provided with a heat dissipation member 300. More specifically, the heat dissipation member 300 is provided on an object side of the rear-side plate 220. Further, the heat dissipation member 300 has, e.g. flexibility for improving the controllability of driving the image sensor holder 238 (movable part).

On the rear-side plate 220, a plurality of magnets 244 are arranged, and on the image sensor holder 238, a plurality of coils 246 are arranged such that the coils 246 are opposed to the magnets 244, respectively. Each coil 246 generates a magnetic field when supplied with electric power via a coil flexible board 270. The swing control of the image sensor unit 230 is performed by making use of repulsion and attraction generated by the magnetic field generated by the coil 246 and the magnet 244.

In general, the image shake correction mechanism 240 performs control to maintain the image sensor unit 230 in an image center position of the image sensor unit 230, and to move the image sensor unit 203 such that image shake of the digital camera 100, which is caused by an image capturing operation of the user, is cancelled out. At a location opposed to each coil 246 in the coil flexible board 270, a metal plate 248 is disposed, and the magnet 244 absorbs the metal plate 248, whereby the image sensor holder 238 is brought into contact with the rear-side plate 220 and the balls 242. This determines a flange-back position of the image sensor 231 in the digital camera 100 at a predetermined location. Note that a connection portion 232*a* will be described with reference to FIG. 3A.

Figure 4A:
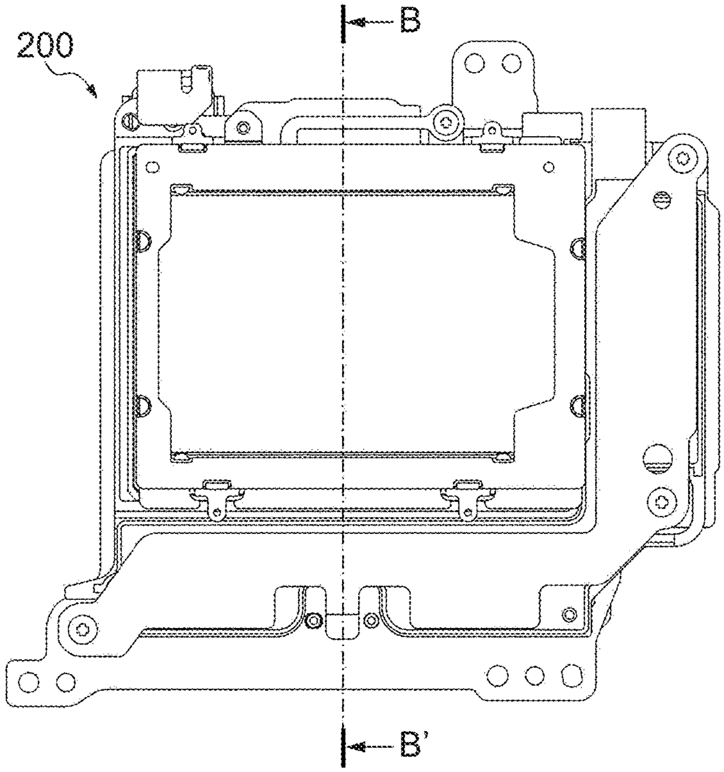
FIGS. 4A and 4B are a front view and a central cross-sectional view of the image capturing unit, respectively.
Figure 4B:
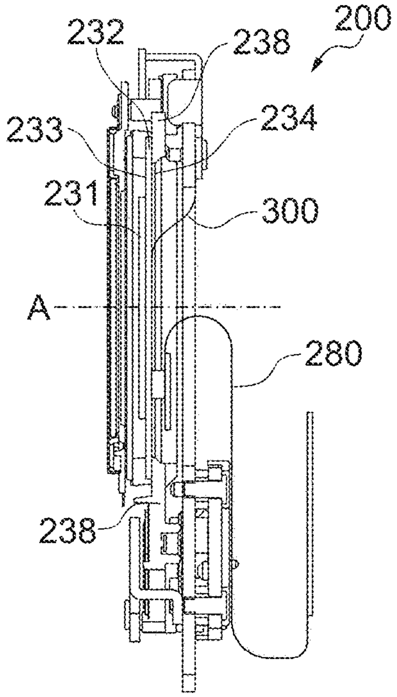

FIG. 4A is a front view of the image capturing unit 200, and FIG. 4B is a central cross-sectional view of FIG. 4A (cross-sectional view along B-B'). The image sensor unit 230 includes the image sensor holder 238 (movable part) that holds the image sensor 231 and the image capturing board 232. The image capturing board 232 includes a first surface 233 on which the image sensor 231 is mounted and a second surface 234 opposed to the first surface 233, and the image processing circuit 60 (see FIG. 1) of the image sensor 231 is mounted on the image capturing board 232.

Further, the heat dissipation member 300 is connected to the second surface 234 of the image capturing board 232 and the rear-side plate 220, and is formed by graphite sheet or the like in the form of laminated PET film or the like. Heat generated by the image sensor 231 is transferred to the rear-side plate 220 via the image capturing board 232, the image sensor holder 238 holding the image capturing board 232, and the heat dissipation member 300, and then to the front base 102 to which the rear-side plate 220 is fixed with screws or the like. Further, heat generated by the image capturing board 232 is transferred to the rear-side plate 220.

Figure 5:
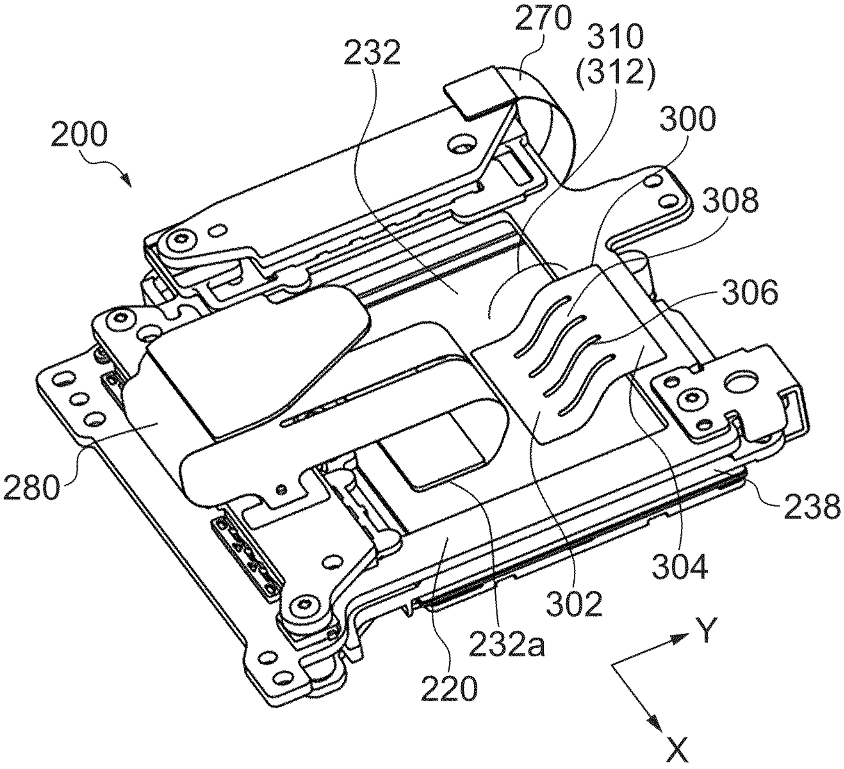
FIG. 5 is a perspective view of the image capturing unit according to the first embodiment.

Next, the heat dissipation member 300 provided on the image shake correction mechanism 240 according to the first embodiment will be described with reference to FIG. 5. In the first embodiment, a central portion of the rear-side plate 220 does not overlap the image capturing board 232. FIG. 5 is a perspective view of the image capturing unit 200 shown in FIGS. 3A and 3B, as viewed from the rear side. Note that in FIG. 5 and the following figures, "X" indicates the width direction of the digital camera 100 and "Y" indicates the height direction of the same.

As shown in FIG. 5, the heat dissipation member 300 includes a board affixing area 302, a support part affixing area 304, and a connection portion 310. More specifically, the board affixing area 302 and the support part affixing area 304 are connected by the connection portion 310. The heat dissipation member 300 is affixed to the board affixing area 302 which can be fixed to the second surface 234 of the image capturing board 232, and to the support part affixing area 304 which can be fixed to the rear-side plate 220, with double-faced tape or the like. Therefore, heat generated by the image sensor 231 (not shown in FIG. 5) and the image capturing board 232 is transferred to the rear-side plate 220. Further, in the present embodiment, the board affixing area 302 is closer to the image capturing optical axis than the support part affixing area 304, and the board affixing area 302 and the support part affixing area 304 do not overlap even at least partially. In other words, the board affixing area 302 and the support part affixing area 304 do not overlap at all.

Temperature distribution in the image sensor 231 differs depending on each device, and also varies with the arrangement of heat generating parts other than the image sensor 231, which are mounted on the image capturing board 232. By forming the board affixing area 302 as part of an area the temperature of which becomes highest or an area close to the part, a temperature difference between the board affixing area 302 and the rear-side plate 220 to which heat is transferred is made larger, whereby heat can be easily transferred. Further, ground wiring and power wiring of the image capturing board 232 include a larger number of connection terminals to the image sensor 231 than the other wiring. Therefore, in a case where the board affixing area 302 is provided on the ground wiring or power wiring of the image capturing board 232, heat of the image sensor 231 can be efficiently transferred to the rear-side plate 220.

The board affixing area 302 is connected preferably as follows. In the first place, the board affixing area 302 is positioned closer to the image capturing optical axis than the support part affixing area 304. Then, the board affixing area 302 is connected to the image capturing board 232 and the rear-side plate 220, such that the respective longitudinal directions of the board affixing area 302 and the support part affixing area 304 are parallel to each other, or the respective longitudinal directions of the board affixing area 302 and the image capturing board 232 are the same direction. When thus configured, the connection path can be made relatively short, and the width of the heat dissipation member 300 can be made larger. As a result, it is possible to increase the amount of heat transfer from the image capturing board 232 to the rear-side plate 220.

The board affixing area 302 is disposed such that the longitudinal direction thereof is parallel to the connection portion 232*a* (see also FIG. 3A and the like) electrically connecting between the image capturing board 232 and the flexible circuit board 280. In general, as the image sensor 231 is increased in pixel number/operation speed, the number of signal lines passing through the flexible circuit board 280 for transmitting/receiving image signals between the image sensor 231 and the print circuit board 120 and the number of terminals of the connection portion 232*a* as well tend to increase. To cope with this, to increase the width of the heat dissipation member 300, it is effective to dispose the board affixing area 302 such that the longitudinal direction thereof is parallel to the connection portion 232*a*.

The connection portion 310 includes a bent portion 312 that is bent as a whole and is formed with slits 306 for reducing load of swing of the image sensor unit 230. The connection portion 310 extends parallel to a connection direction of the image capturing board 232 and the rear-side plate 220. Part other than the slits 306 is a heat transfer portion 308 filled with graphite sheet or the like. The width of each slit 306 is set to a width which prevents adjacent portions of the heat transfer portion 308 from being brought into contact with each other even when the position of the image sensor unit 230 is changed to the maximum, thereby preventing generation of load by contact between the portions of the heat transfer portion 308. Further, the slit 306 and the bent portion 312 can be provided in plurality, and the connection portion 310 can be configured such that the connection portion 310 extends from both of the board affixing area 302 and the support part affixing area 304 in a Y direction (direction perpendicular to the optical axis direction) and one or more bent portions 312 of the connection portion 310 connect(s) between the board affixing area 302 and the support part affixing area 304.

Next, the heat dissipation member 300 provided in the image shake correction mechanism 240 according to a second embodiment will be described with reference to FIGS. 6A and 6B. In the second embodiment, part of the rear-side plate 220 is overlapped with the image capturing board 232.

Figure 6A:
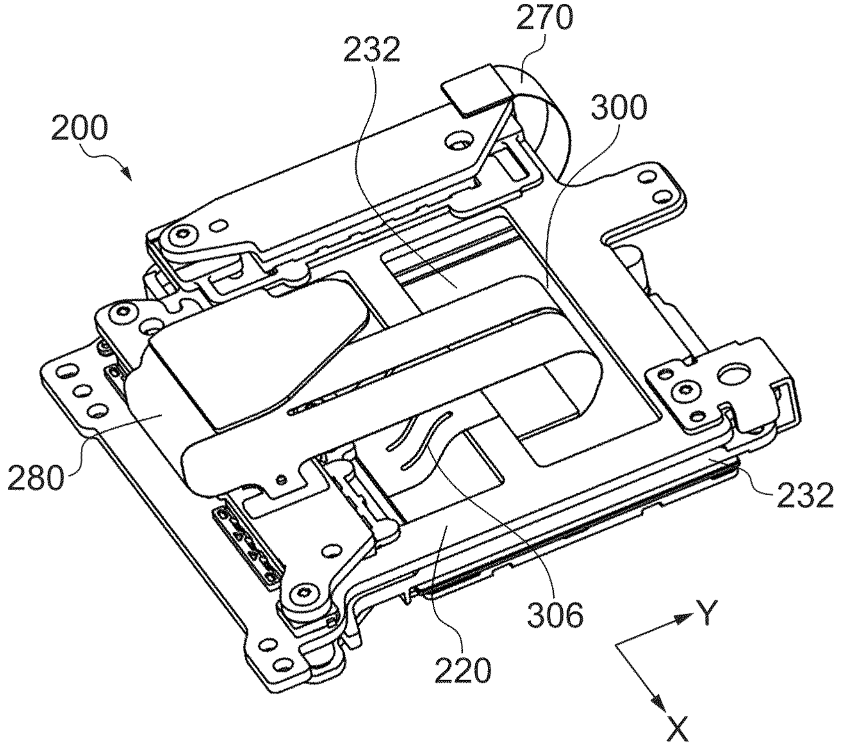
FIGS. 6A and 6B are perspective views of an image capturing unit according to a second embodiment.
Figure 6B:
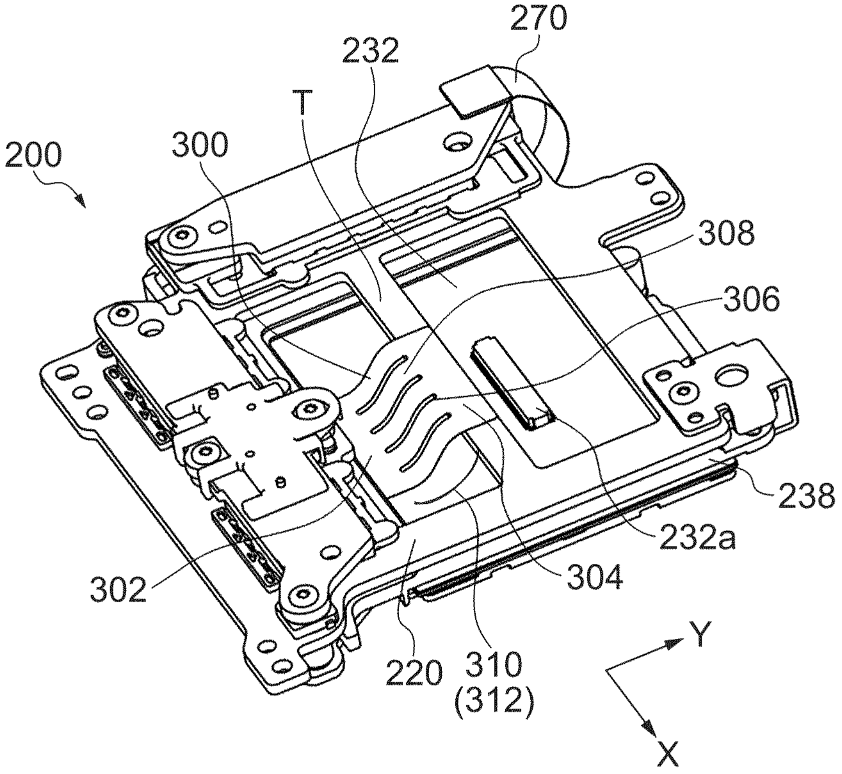

FIGS. 6A and 6B are perspective views of the image capturing unit 200 according to the second embodiment, as viewed from the rear side. FIG. 6A shows the image capturing unit 200 in a state having the flexible circuit board 280 connected thereto, while FIG. 6B shows the image capturing unit 200 in a state having the flexible circuit board 280 removed therefrom. As shown in FIGS. 6A and 6B, in the configuration in which part of the rear-side plate 220 is overlapped with the image capturing board 232 (see symbol T), the support part affixing area 304 of the heat dissipation member 300 can be affixed such that it is positioned closer to the image capturing optical axis than the board affixing area 302.

Figure 7:
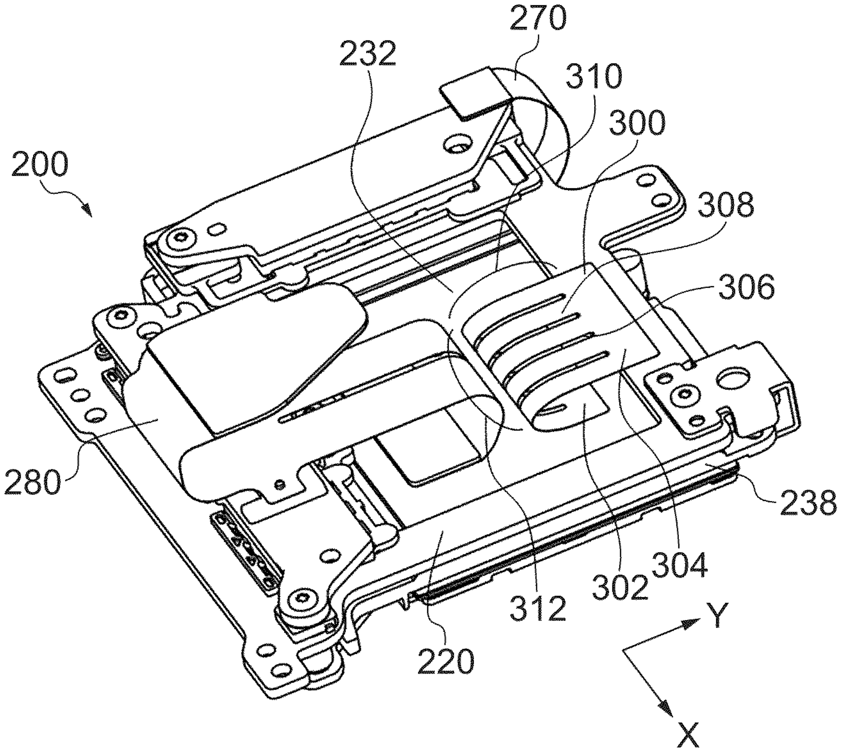
FIG. 7 is a perspective view of an image capturing unit according to a third embodiment.

Next, the heat dissipation member 300 provided in the image shake correction mechanism 240 according to a third embodiment will be described with reference to FIG. 7. FIG. 7 is a perspective view of the image capturing unit 200 according to the third embodiment, as viewed from the rear side.

As shown in FIG. 7, in the third embodiment, the configuration is such that the connection portion 310 of the heat dissipation member 300 extends from both of the board affixing area 302 and the support part affixing area 304 toward the image capturing optical axis, and the bent portion 312 connects extensions from the both sides. That is, the heat dissipation member 300 is bent in a U shape, in a lateral view, as a whole. In this configuration, the heat dissipation member 300 is longer than in the first and second embodiments, and hence in a case where the range of motion of the image shake correction mechanism 240 is large, the image shake correction mechanism 240 is easy to follow the motion.

Figure 8A:
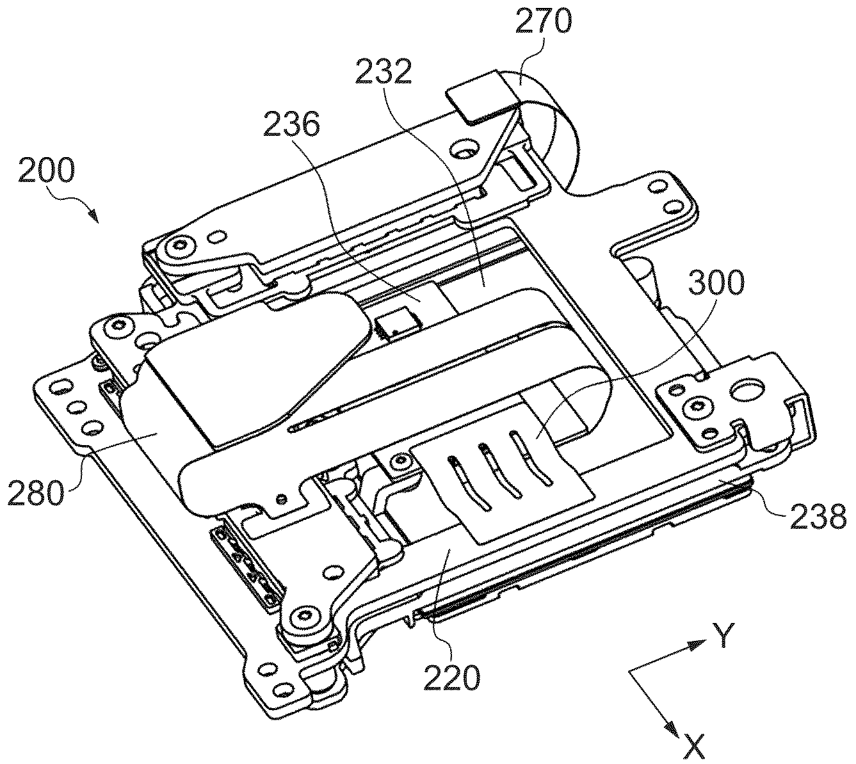
FIGS. 8A and 8B are perspective views of an image capturing unit according to a fourth embodiment.
Figure 8B:
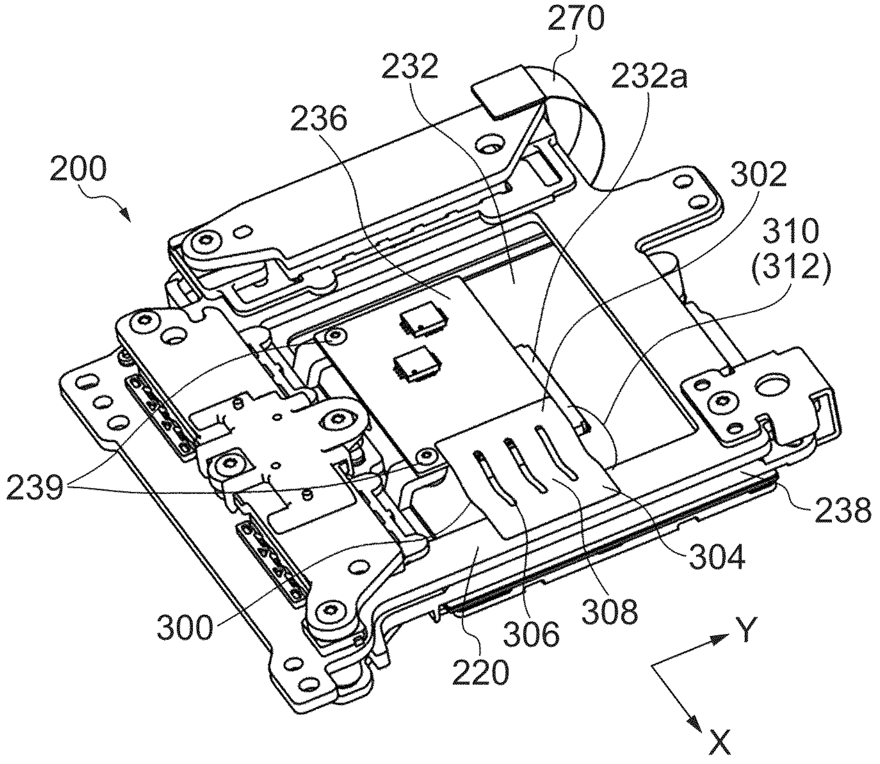

Next, the heat dissipation member 300 provided in the image shake correction mechanism 240 according to a fourth embodiment will be described with reference to FIGS. 8A and 8B. FIGS. A and 8B are perspective views of the image capturing unit 200 according to the fourth embodiment, as viewed from the rear side. FIG. 8A shows the image capturing unit 200 having the flexible circuit board 280 connected thereto, and FIG. 8B shows the image capturing unit 200 having the flexible circuit board 280 removed therefrom. In the fourth embodiment, a second image capturing board 236 and the rear-side plate 220 are connected by the heat dissipation member 300.

The image processing circuit 60 of the image sensor 231 is mounted on the second image capturing board 236, and the second image capturing board 236 is electrically connected to the image capturing board 232 via connectors (not shown). Further, the second image capturing board 236 is fixed to the image sensor holder 238 as well with screws 239 or the like.

The heat generation member 300 connects between the second image capturing board 236 and the rear-side plate 220, for transferring heat generated by the second image capturing board 236 to the rear-side plage 220. The second image capturing board 236 is thermally connected to the image capturing board 232 via a connector (not shown) and the image sensor holder 238. This makes it possible to transfer heat of the image sensor 231 and the image capturing board 232 via the second image capturing board 236.

Figure 9:
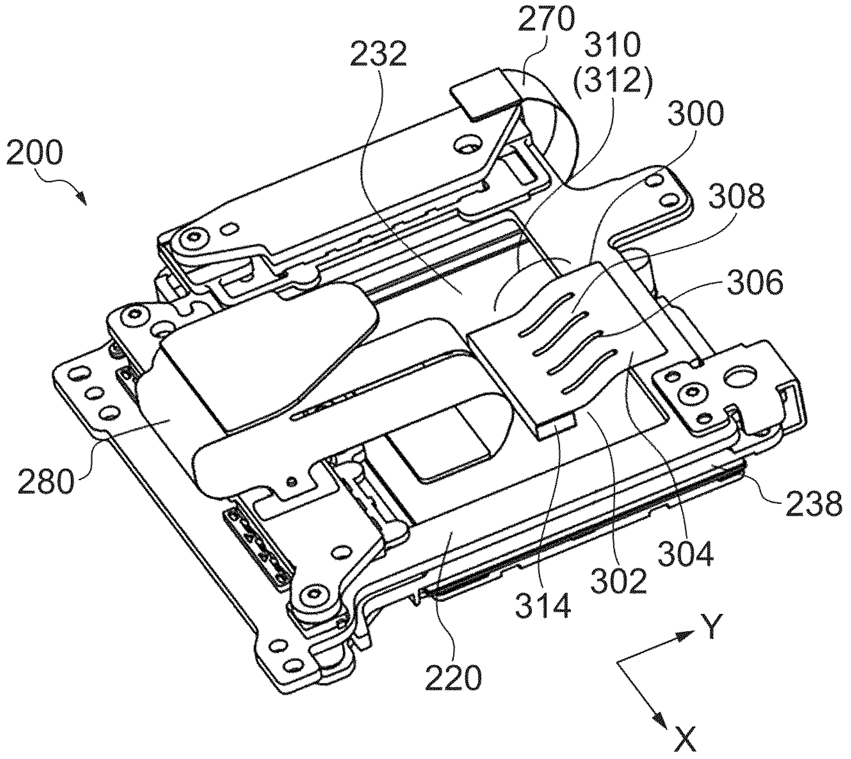
FIG. 9 is a perspective view of an image capturing unit according to a fifth embodiment.

Next, the heat dissipation member 300 provided in the image shake correction mechanism 240 according to a fifth embodiment will be described with reference to FIG. 9. FIG. 9 is a perspective view of the image capturing unit 200 according to the fifth embodiment, as viewed from the rear side. The heat dissipation member 300 according to the fifth embodiment is affixed to the image capturing board 232 by wrapping one end of graphite sheet formed by laminating PET film or the like around a resilient member 314, and is affixed to the rear-side plage 220 by the other end of the same which is opposite to the one end with the connection portion 310 therebetween.

According to such a configuration, a difference in height in the optical axis direction between one end and the other end of the heat dissipation member 300 is reduced by the height of the resilient member 314. Therefore, it is possible to reduce the length of the connection portion 310 formed with the slits 306, and perform efficient transfer of heat generated by the image sensor 231 and the image capturing board 232 to the rear-side plate 220.

Further, in such a configuration including the second image capturing board 236 as in the fourth embodiment, the heat dissipation member 300 can be brought into contact with the second image capturing board 236. This makes it possible to further improve the heat transfer effects, by providing an additional heat transfer path in a different direction, as from the second image capturing board 236 to the rear-side plate 220.

The preferred embodiments of the present disclosure has been described heretofore, but the present disclosure is not limited to these embodiments. A variety of variations and modifications are possible within the scope of this disclosure without departing from the spirit and scope of the disclosure. For example, the number of the slits 306 formed in the heat dissipation member 300 and the interval therebetween are not limited to those illustrated in the figures. Further, the direction in which are slits 306 are formed is not required to be limited to the Y direction in FIG. 5, but can be a direction which is slightly different from the Y direction.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-083400 filed May 22, 2024, which is hereby incorporated by reference herein in its entirety.

What is claimed is:

1. An image capturing apparatus including an image shake correction mechanism including a movable part for holding an image sensor and a support part that supports the movable part such that the movable part is movable in a direction perpendicular to an optical axis direction, comprising:

an image capturing board on which the image sensor is mounted; and a heat dissipation member, wherein the heat dissipation member is formed by:

a board affixing area which is affixed to the image capturing board, a support part affixing area which is affixed to the support part, and a connection portion that connects between the board affixing area and the support part affixing area, wherein the board affixing area is located closer to an image capturing optical axis than the support part affixing area, and does not overlap the support part affixing area.

2. The image capturing apparatus according to claim 1, wherein the board affixing area is located farther in the optical axis direction than the support part affixing area.

3. The image capturing apparatus according to claim 1, wherein the board affixing area is part of an area of the image capturing board, a temperature of which area becomes high, or is close to the part.

4. The image capturing apparatus according to claim 1, wherein the board affixing area is on ground wiring or power supply wiring of the image capturing board.

5. The image capturing apparatus according to claim 1, wherein a longitudinal direction of the board affixing area and a longitudinal direction of the support part affixing area are parallel to each other.

6. The image capturing apparatus according to claim 1, wherein a longitudinal direction of the board affixing area and a longitudinal direction of the image capturing board are the same.

7. The image capturing apparatus according to claim 1, wherein the image capturing board includes a first surface on which the image sensor is mounted and a second surface opposed to the first surface, and wherein the heat dissipation member connects between the second surface and the support part.

8. The image capturing apparatus according to claim 1, wherein the connection member includes slits parallel to a direction of connecting the image capturing board and the support part, and a bent portion.

9. The image capturing apparatus according to claim 1, wherein the connection member connects the board affixing area and the support part affixing area by at least one bent portion that extends from both of the board affixing area and the support part affixing area in a direction perpendicular to the optical axis direction.

10. The image capturing apparatus according to claim 1, wherein the heat dissipation member is affixed to the image capturing board by wrapping one end thereof around a resilient member and has another end affixed to the support part, the other end being opposite to the one end with the connection portion therebetween.

11. An image capturing apparatus including an image shake correction mechanism including a movable part for holding an image sensor and a support part that supports the movable part such that the movable part is movable in a direction perpendicular to an optical axis direction, comprising:

an image capturing board on which the image sensor is mounted;

a second board fixed to the image capturing board; and a heat dissipation member that connects between the second board and the support part, wherein the heat dissipation member is formed by:

a board affixing area which is affixed to the second board, a support part affixing area which is affixed to the support part, and a connection portion that connects between the board affixing area and the support part affixing area, and wherein the board affixing area is located closer to an image capturing optical axis than the support part affixing area, and does not overlap the support part affixing area.

* * * * *